United States Patent [19]
Garg et al.

[11] Patent Number: 6,161,193
[45] Date of Patent: Dec. 12, 2000

[54] METHODS AND APPARATUS FOR PROCESS REPLICATION/RECOVERY IN A DISTRIBUTED SYSTEM

[75] Inventors: Sachin Garg; Yennun Huang; Sampath Rangarajan, all of Bridgewater, N.J.

[73] Assignee: Lucent Technologies Inc., Murray Hill, N.J.

[21] Appl. No.: 09/044,054

[22] Filed: Mar. 18, 1998

[51] Int. Cl.⁷ .................................................. G06F 11/00
[52] U.S. Cl. ............................................................ 714/6
[58] Field of Search ............................. 714/2, 4, 6, 7, 714/11, 13, 12, 15, 47, 48, 52; 370/220, 226; 711/114

[56] References Cited

U.S. PATENT DOCUMENTS

| | | | |
|---|---|---|---|
| 5,473,771 | 12/1995 | Burd et al. | 714/4 |
| 5,675,807 | 10/1997 | Iswandhi et al. | 714/48 |
| 5,751,932 | 5/1998 | Horst et al. | 714/12 |
| 5,987,432 | 11/1999 | Zusman et al. | 714/11 |

OTHER PUBLICATIONS

Roll–forward and roolback recovery, Pradhan et al. p. 186–195, IEEE 1994.

D.K. Pradhan and N.H. Vaidya, "Roll–Forward and Roll-back Recovery: Performance–Reliability Trade–Off," Proc. Fault–Tolerant Computing Symposium, pp. 186–195, 1994.

D.K. Pradhan and N.H. Vaidya, "Roll–Forward Checkpointing Scheme: A Novel Fault–Tolerant Architecture," IEEE Transactions on Computers, vol. 43, No. 10, pp. 1163–1174, Oct. 1994.

A. Duda, "The Effects of Checkpointing on Program Execution Time," Information Processing Letters, 16 (1983), pp. 221–229, Jun. 1983.

R. Shridhar, "Hydra: A Novel Mechanism for Process Migration in Distributed Systems Using Process Replication," Thesis, Graduate School of Engineering, Northeastern University, Boston, MA, 1996.

*Primary Examiner*—Robert W. Beausoliel, Jr.
*Assistant Examiner*—Pierre E Elisca
*Attorney, Agent, or Firm*—Ryan, Mason & Lewis, LLP

[57] ABSTRACT

A distributed computing system includes a number of computers, workstations or other computing machines interconnected by a network. A non-interactive process arriving in a host machine of the system is migrated for execution to at least two remote machines. For example, first and second executions of the process may be started on respective first and second remote machines. One of the first and second executions of the process is then used to provide an on-demand checkpoint for the other execution of the process in the event the other execution is terminated, such that an additional execution of the process can be started from the on-demand checkpoint. This on-demand checkpointing is augmented with periodic checkpointing performed on at least one of the multiple executions of the process. The period of the periodic checkpointing for a given execution of the process may be fixed without regard to the status of the on-demand checkpointing for that execution, or alternatively may be reset each time an on-demand checkpoint is taken for that execution.

24 Claims, 3 Drawing Sheets

METHODS AND APPARATUS FOR PROCESS REPLICATION/RECOVERY IN A DISTRIBUTED SYSTEM

FIELD OF THE INVENTION

The present invention relates generally to distributed computing systems, and more particularly to techniques for allowing processes executing in a distributed system to recover from process failures, machine failures and interactive process arrivals.

BACKGROUND OF THE INVENTION

In a distributed computing system, processes from heavily loaded machines are often migrated to lightly loaded machines in order to utilize the computing resources more efficiently. Such load sharing is especially useful when long-running non-interactive processes are initiated at a given machine. These long-running processes can take up a large number of central processing unit (CPU) cycles for an extended period of time, and thus slow down shorter interactive processes that are submitted to that machine. If the system includes idle remote machines accessible over a network, the long-running applications could be migrated from their local host machines to one or more remote machines. A given migrated process may then be subsequently preempted, transferred to another remote machine, and restarted from a checkpointed state if, for example, an interactive process arrives in the first remote machine or a failure occurs in the first remote machine. The arrival of an interactive process generally necessitates the termination of all remote non-interactive processes if it is required that an interactive user not be slowed down by remote non-interactive processes for which he or she is not the owner. This type of preemption and transfer can continue until the migrated process is completed.

A number of conventional systems implement load sharing based on the above-described process migration techniques. The operation of these conventional systems can be generalized as follows. When a host machine makes a decision to migrate a non-interactive process, a single execution of this process is started on a designated remote machine. This process is then periodically checkpointed. If there is an interactive process arrival on the remote machine or a process or machine failure occurs on that machine, the migrated process is terminated and restarted from the previous checkpoint on another remote machine, or on the same remote machine in case of a process failure. This technique thus involves a "rollback" to the previous checkpoint, and as a result a considerable amount of computation time may be wasted. Conventional periodic checkpointing techniques therefore fail to provide optimal performance in terms of minimizing the expected completion time of a migrated process.

It has also been suggested to implement on-demand checkpointing to overcome the above-noted problems associated with conventional periodic checkpointing. However, proposed implementations of on-demand checkpointing have heretofore generally been viewed as complete replacements for periodic checkpointing.

SUMMARY OF THE INVENTION

We have recognized that a combination of on-demand and periodic checkpointing can provide improved performance relative to either on-demand or periodic checkpointing used alone. The invention thus provides methods and apparatus which utilize a combination of on-demand and periodic checkpointing to enable application processes in a distributed system to recover from process failures, machine failures and interactive process arrivals.

In an illustrative embodiment of the invention, a distributed computing system includes a number of computers, workstations or other machines interconnected by a network. A non-interactive process arriving in a host machine of the system is migrated for execution to at least two remote machines. For example, first and second executions of the process may be started on respective first and second remote machines. One of the first and second executions of the process is then used to provide a checkpoint for the other execution of the process in the event the other execution is terminated, such that an additional execution of the process can be started from the checkpoint. The other execution may be terminated due to a process failure on the corresponding one of the remote machines, in which case the additional execution of the process may be started on the same remote machine. If the other execution is terminated due to (i) a failure of the corresponding one of the remote machines, or (ii) arrival of an interactive process at the corresponding one of the remote machines, the additional execution of the process is started on a different remote machine.

In accordance with the invention, the above-described on-demand checkpointing is augmented with periodic checkpointing performed on one of the first and second executions of the process. In one possible implementation, the periodic checkpointing may be performed in accordance with a fixed period, such that a periodic checkpoint is taken for a given execution of the process regardless of the status of the on-demand checkpointing for that execution of the process. Alternatively, a timer which measures the interval for the periodic checkpointing for a given execution of the process may be reset each time an on-demand checkpoint is taken for that execution of the process.

The invention reduces the expected completion time of a long-running, non-interactive process by eliminating the need for taking more frequent periodic checkpoints, and by reducing the number of rollbacks expected to occur during its execution. A feature of remote execution in accordance with the invention is that for large failure rates it provides substantially smaller roll-back overhead, and for small failure rates it provides a substantially smaller checkpoint overhead, as compared to a conventional single-copy algorithm with more frequent periodic checkpointing. Improvements are also provided relative to systems utilizing only on-demand checkpointing.

DETAILED DESCRIPTION OF THE INVENTION

Figure 1:
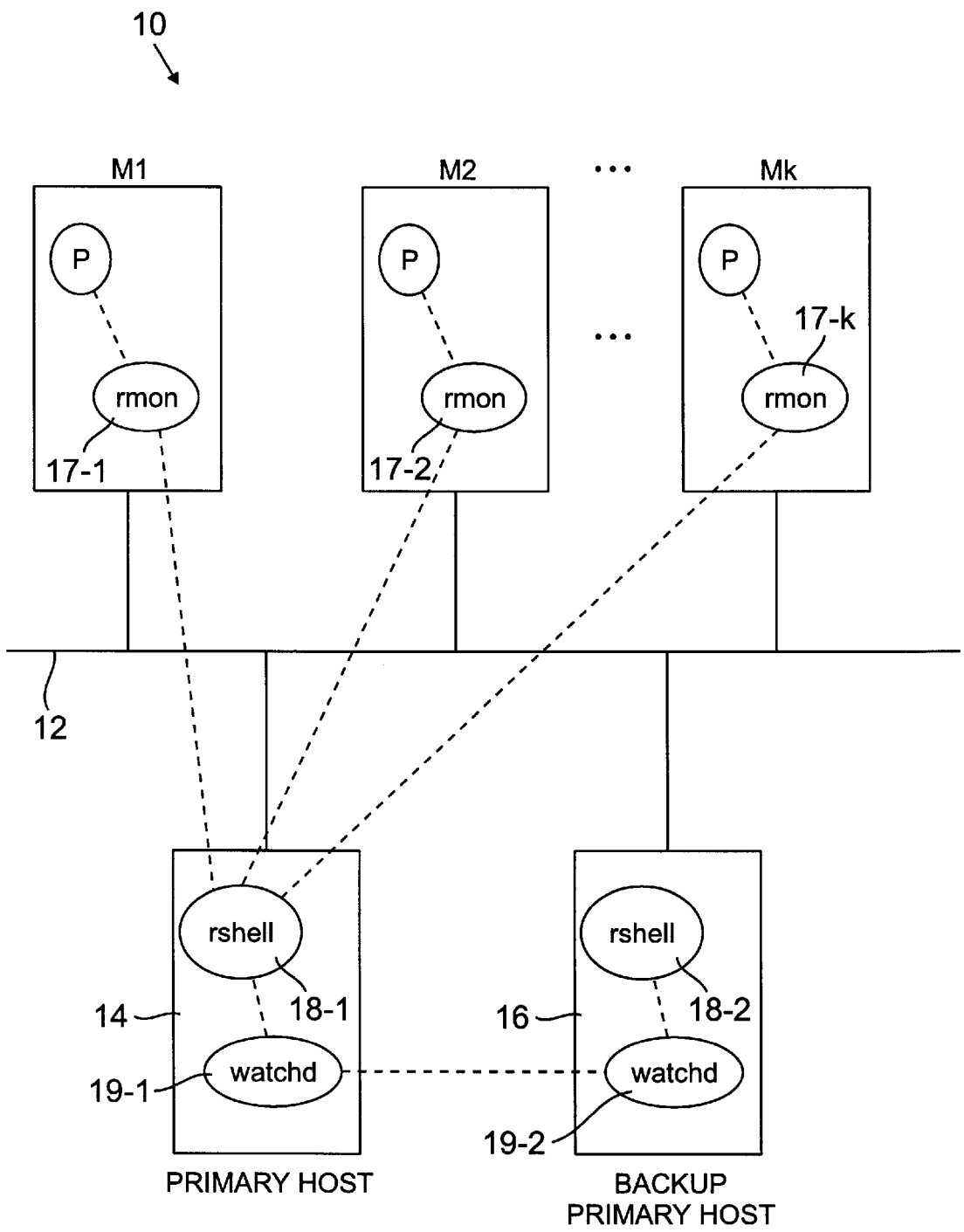
FIG. 1 is a block diagram illustrating an exemplary distributed computing system in which the invention may be implemented.

The present invention will be illustrated below in conjunction with an exemplary distributed computing system. It should be understood, however, that the invention is not limited to use with any particular type of distributed system, but is instead more generally applicable to any distributed computing environment or application in which it is desirable to improve computational efficiency by reducing the completion time of processes. The disclosed techniques can be utilized with computers or other processors arranged in local area networks, wide area networks, metropolitan area networks, intranets, extranets and global networks such as the Internet. The term "process" as used herein is intended to include any type of program, instruction, code or the like which runs on one or more computers or other types of processors in a distributed system. The term "distributed system" is intended to include any system which includes two or more computers, machines or processors. the term "checkpoint" as used herein is intended to include any set of information characterizing the state of an execution of a process at a given point in time. The term "host machine" refers generally to a computer, workstation or other processing device which receives a process and directs its execution on one or more remote machines. The term "remote machine" as used herein refers generally to any computer, workstation or other processing device which executes a process migrated from a host machine. A remote machine in accordance with the invention therefore need not be geographically remote from the host machine.

As described above, when a host machine in a conventional distributed computing system makes a decision to migrate a non-interactive process, an execution of this process is typically started on a remote machine, and the execution of this process is then periodically checkpointed. If there is an interactive process arrival on the remote machine or a process or machine failure occurs on that machine, the migrated process is terminated and restarted on another machine, or on the same machine in case of a process failure, from the previous checkpoint. This involves a rollback to the previous checkpoint, such that a certain amount of computation time is wasted. The invention makes use of the fact that, in a large network of machines, there may be a sufficient number of idle machines to permit a scheduler running on a host machine to remotely execute two or more copies of a non-interactive process that has been locally submitted. As a result, if one copy of the process is terminated, instead of the conventional rollback, an on-demand checkpoint can be taken of a second copy of the process and another execution of the process started from that checkpoint.

The invention in an illustrative embodiment provides a remote execution algorithm which starts two or more executions of a given process, and then implements on-demand checkpointing in the manner noted above. In this algorithm, checkpoints taken of a migrated process are used primarily to start another copy of the process, rather than primarily to perform rollbacks. The illustrative embodiment may be configured such that a process that is executing on a remote machine may be restarted from a checkpoint on the same or another remote machine for any of the following reasons: (1) a process failure occurs, in which case the process could be restarted on the same remote machine; (2) a remote machine failure occurs; or (3) an interactive process arrives at the remote machine. These three possibilities will be generally referred to herein as "failures."

In the case of a process failure, or an interactive process arrival, the host machine may be informed of this by a monitor program that monitors the migrated process on the remote machine. In the case of a remote machine failure, the host machine may receive diagnostic information through, for example, a ping mechanism, or a distributed system level diagnosis algorithm such as that described in S. Rangarajan, A. T. Dahbura, E. Ziegler, "A distributed system-level diagnosis algorithm for arbitrary network topologies," IEEE Transactions on Computers, Special Issue on Fault-Tolerant Computing, Vol. 44, No. 2, pp. 312–334, February 1995, which is incorporated by reference herein.

FIG. 1 shows an exemplary distributed computing system 10 in which the invention may be implemented. The system 10 includes a group of remote machines M1, M2, . . . Mk connected through a local area network (LAN) 12 to a primary host machine 14 and a backup primary host machine 16. The remote machines M1, M2, . . . Mk and the hosts 14, 16 may be computers, workstations, or other types of processors, as well as various combinations thereof. It will be assumed for purposes of illustration that in system 10 processes are arriving on the host machine 14, and are considered for migration to one of the remote machines Mi, i=1, 2, . . . k. It should be noted that each of the remote machines Mi of the system 10 may operate as a host machine for the processes arriving at that machine, and that the host machines 14, 16 may operate as remote machines for processes migrated from the machines Mi.

In general, if a process arriving at a given machine of system 10 is an interactive process, it is generally always executed locally at that machine. If it is a non-interactive process, then a determination is made by a scheduler program on that machine as to whether the process should be executed locally or should be migrated and executed at one or more of the other machines. For example, an interactive process arriving at host machine 14 is generally executed on host machine 14. If a process arriving at host machine 14 is non-interactive, a scheduler program rshell 18-1 determines whether the process should be executed locally or migrated to one or more of the remote machines Mi. A watchd program 19-1, to be described in greater detail below, is also executing on the host machine 14. Corresponding rshell and watchd programs 18-2 and 19-2 are operating on the backup host machine 16, and are used in the event of a failure of the primary host machine 14.

When a process P is migrated from host machine 14 in accordance with the invention, k parallel executions of the process P may be started on k different remote machines Mi, as shown in FIG. 1. Together with each of these executions, a monitor process rnon 17-i, i=1, 2, . . . k, is started on each of the remote machines Mi and serves to monitor the corresponding execution of process P on that machine. These parallel executions of process P are generally started on remote machines Mi with no interactive processes running on them, if such machines are available. An execution of a migrated process P on a given remote machine Mi can then be restarted from a checkpoint on the same or another remote machine if a failure occurs at machine Mi.

Figure 2:
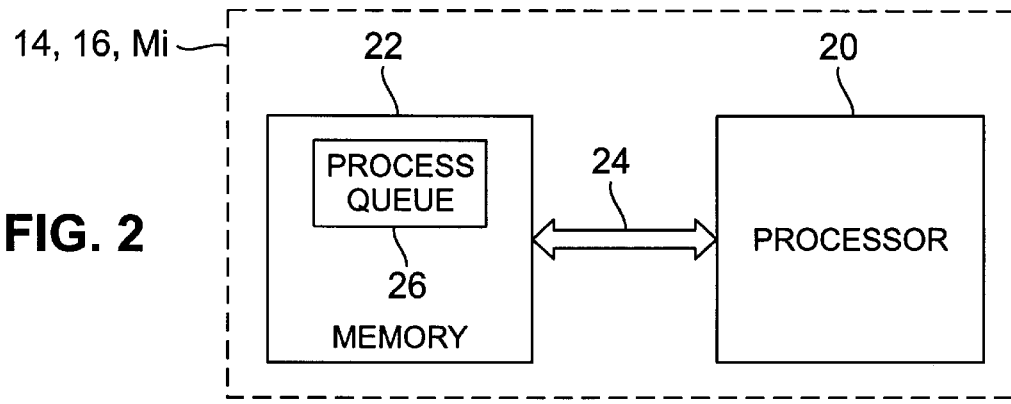
FIG. 2 shows a more detailed view of an exemplary machine in the distributed computing system of FIG. 1.

FIG. 2 shows a more detailed view of an exemplary one of the remote machines Mi, i=1, 2, . . . k or host machines 14, 16 of system 10. Each of the machines in system 10 includes a processor 20 which is coupled to a memory 22 over a bus 24. The memory 22 includes a process queue 26 into which the processes that arrive to be executed on that machine are placed. This process queue may contain both interactive and non-interactive processes. As noted above, interactive processes arriving at a given machine are generally always executed locally at that machine, while non-interactive processes may be migrated to other machines in the system 10. The remote machines Mi and primary and backup host machines 14, 16 in FIG. 1 may thus each be configured in a similar manner.

Figure 3:
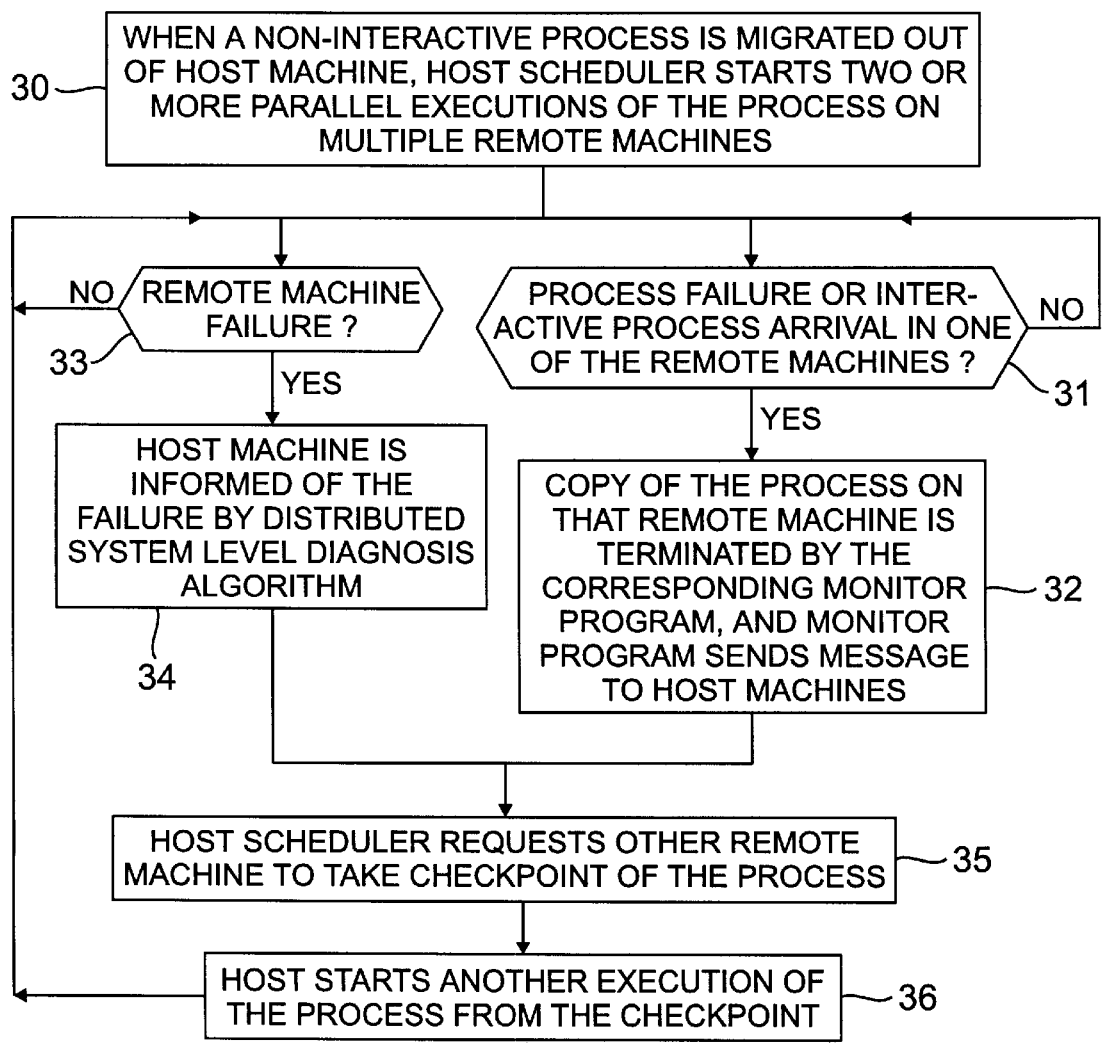
FIG. 3 is a flow diagram illustrating an exemplary distributed computing algorithm in accordance with the invention.

FIG. 3 is a flow diagram illustrating the operation of an exemplary remote execution algorithm in accordance with the invention. Step 30 indicates that when a non-interactive process P is migrated out of host machine 14, instead of starting just one execution of the process P on a remote machine, scheduler program rshell 18-1 on the host machine 14 will start two or more parallel executions or "copies" of the process P on multiple remote machines Mi. For purposes of illustration, it will be assumed that two executions of P are started. Steps 31 and 32 indicate that when either a process failure or an interactive process arrival occurs in one of the remote machines Mi, the copy of the non-interactive process P on that machine is terminated by the corresponding monitor program rmon 17-i, and the monitor program rmon 17-i sends a corresponding termination message to the host machine 14. The monitor program rmon 17-i will subsequently terminate itself As shown in steps 33 and 34, when a remote machine failure occurs, the host will be informed of this by the above-noted distributed system level diagnosis algorithm, which may be running continuously in the background. After completion of step 32 or 34, the scheduler program rshell 18-1 on the host machine 14 will request the second remote machine to take a checkpoint of the other copy of the process P, as shown in step 35. Then the host machine 14 will start another execution of the process from that checkpoint, as shown in step 36. This new execution of the process may be started on the same remote machine, if the failure was a process failure, or on another remote machine if the failure was a remote machine failure or an interactive process arrival.

In the exemplary algorithm of FIG. 3, at any given time, two executions of the migrated process P will be executing on two different remote machines. As a result, when a non-interactive process has to be terminated in one of the remote machines, the other remote machine can be used to checkpoint the process P and start another execution of the process from that checkpoint. Thus, one possible embodiment of the invention can require checkpoints to be taken on demand. This type of checkpointing is referred to herein as "on-demand" checkpointing. In accordance with the invention, on-demand checkpointing may be augmented with periodic checkpoints having designated periods or other characteristics which provide improved performance relative to the use of on-demand or periodic checkpointing alone.

When a host machine requests the second remote machine to take an on-demand checkpoint, it is possible for a failure to occur on this remote machine before the checkpoint can be taken. In this case, the non-interactive process is terminated without taking the checkpoint requested by the host. The host will then roll back the process to the most recent checkpoint. This most recent checkpoint may have been taken from either one of the two remote executions that have now been terminated. Two new executions of the process are then started on two other remote machines. The invention can thus allow roll-back of a non-interactive process, but such roll-backs will generally occur only very rarely. For example, in an embodiment in which k executions of a process are running on k different machines, a roll-back may occur only if failures occur at all the k machines within the relatively small interval of time required to take a checkpoint. It can be shown that an embodiment of the invention with k=2 achieves performance close to the best achievable performance, such that increasing k beyond 2 becomes unnecessary in many applications. A desirable property of the remote execution algorithm of the invention is that for large failure rates it has substantially smaller roll-back overhead, while for small failure rates it has much smaller checkpoint overhead when compared to a conventional single-copy algorithm with only periodic checkpoints.

Figure 4:
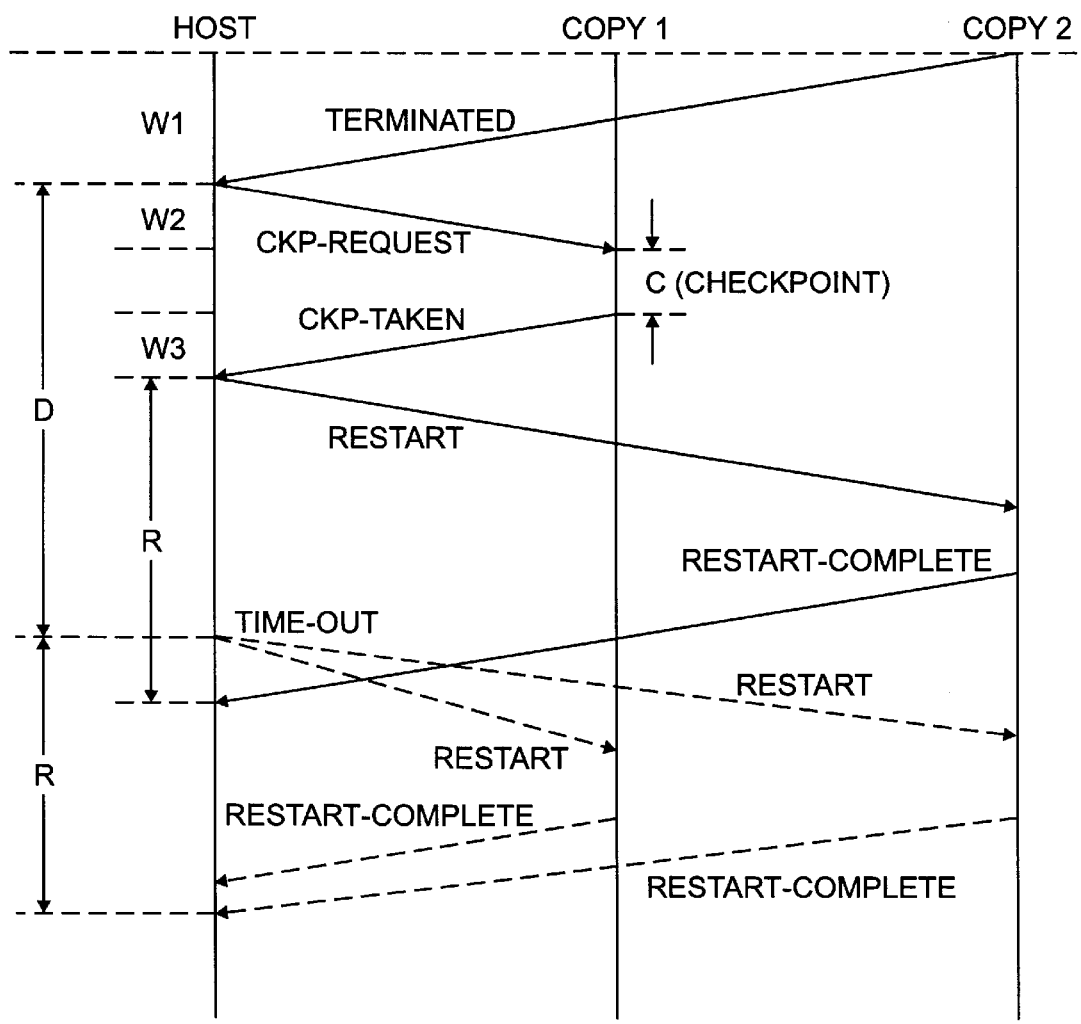
FIG. 4 is a diagram illustrating message flows in a distributed computing system in accordance with an exemplary embodiment of the invention.

FIG. 4 illustrates exemplary interactions between host machine 14 and the remote monitor programs rmon 17-1 and 17-2 that monitor two copies of a given process P. These two copies are designated copy 1 and copy 2. If there is a process failure or an interactive arrival at the remote machine executing copy 2, then its monitor program will send a "Terminated" message back to the host machine as shown. If the monitor program itself fails or the corresponding remote machine fails, then this will be detected at the host machine, for example, by a time-out to a ping message or a system level diagnostic algorithm. The time between the failure and its detection at the host machine, referred to as the detection latency, is represented by W1 in FIG. 4. The host machine then initiates a checkpoint at the remote machine executing copy 1 by sending a "Ckp-request" message to that machine. The delay of this message is represented by W2. After sending the Ckp-request message, the host machines waits on a time-out timer, denoted by D. After the remote machine executing copy 1 takes a checkpoint, which takes an amount of time C, it sends a "Ckp-taken" message back to the host machine. This message arrives at the host after an amount of time W3.

If the Ckp-taken message arrives at the host machine before the timer expires, the host machine will restart copy 2 either on the same remote machine or on a different remote machine. This will involve the host machine sending a "Restart" message to the remote machine associated with copy 2. Time R represents the time, at the host machine, for a successful restart, and may include multiple tries if restarts are unsuccessful. A "Restart-complete" message notifies the host machine that a restart was successful. On the other hand, if the timer expires before the Ckp-taken message is received, one of the following two events could have occurred: (1) either the checkpoint failed due to the failure of copy 1 while it was in progress; or (2) the Ckp-taken message is simply delayed too much. Regardless of the cause, however, a Restart message is sent to both of the remote machines executing copy 1 and copy 2 as shown by the dotted lines in FIG. 2. This restart also takes time R.

A lower bound for the expected completion time of a process in the above-described remote execution algorithm will now be derived. This lower bound is based on a simplifying assumption that no failures occur during checkpoint operations, and thus provides an indication of the best performance possible with the algorithm. In an embodiment implementing the above-described algorithm with k=2, the arrival of every failure at a machine where a copy of the process is running leads to a checkpoint in the machine where the other copy of the process is running. That is, whenever there is a failure arrival, there is a synchronization between the two copies of the processes. This means, every failure "slows down" both copies of the process by a checkpoint overhead. The process which is running on the machine where a failure occurs is slowed down due to being terminated and restarted again after a checkpoint is taken. The process that takes a checkpoint is slowed down because of the checkpoint.

The total expected number of failures on the two machines over a period of time w will be $2\lambda w$, where $\lambda$ is the mean inter-arrival rate of failures and w is the base execution time, or the amount of time it takes for a process to execute when there are no restarts and no checkpointing. This is also the expected number of checkpoints taken. Each process is therefore "slowed down" on average by an amount $2\lambda wC$, where C is the checkpoint overhead. Thus, the lower bound on the expected completion time of a process in the above-described algorithm may be given by:

$$E[T_{lb}(w)] = w + w^*2\lambda C = w(1+2\lambda C).$$

Removing the assumption of no failures during checkpoint operation introduces the possibility of a roll-back in the event a checkpoint operation is unsuccessful. Although the probability of such roll-backs can be decreased by increasing the value of k, in many practical applications a value of k=2 can provide acceptable performance. Increasing k in order to decrease the probability of rollback will generally only provide marginal return. Augmenting the on-demand checkpoint algorithm with periodic checkpoints with large periods can provide significant improvements.

It can be shown that the above-described checkpoint algorithm with k=2 performs substantially better than a conventional single copy algorithm that takes only periodic checkpoints. It can also be shown that the above-described remote execution algorithm also provides improved performance relative to an alternative technique in which k copies of a process are executed simultaneously but no checkpointing is performed. If all k copies fail before completion, all of them are restarted from the beginning. It should be noted that for higher failure rates, for instance when the failures are interactive process arrivals, the number of copies needed to equal or better the checkpointing algorithm described in conjunction with FIG. 3 is very large. Even if the failure rate is very low, for instance in systems where the only failures are machine or process failures, the invention can provide improved performance relative to a practical k-copy technique without checkpointing.

Additional aspects of the system 10 of FIG. 1 will now be described in greater detail. The system 10 makes use of the watchd mechanism described in Y. Huang and C. M. R. Kintala, "Software Implemented Fault-tolerance: Technologies and Experience," Proc. of the 23rd International Symposium on Fault-tolerant Computing, pp. 2–9, June 1993, and the libckp mechanism described in Y. M. Wang, Y. Huang, K. P. Vo, P. Y. Chung and C. Kintala, "Checkpointing and its Applications," Proceedings of the 25th Fault-Tolerant Computing Symposium, pp. 22–31, June, 1995, both of which are incorporated by reference herein.

As described above, migrating processes from a host machine and running them on remote machines generally involves two main steps. The first step is the delivery of the process by the host machine 14 to a designated set of remote machines Mi, and the second step is the actual execution, monitoring, and periodic checkpointing of the process on the remote machines Mi. The first step may be performed by the schedule program rshell 18-1 running on the host machine 14 and the second step may be performed by the rmon monitor program 17-i running on the remote machines Mi. In accordance with the invention, an integrated fault-diagnosis and load monitoring program, which will be referred to as loadmon, continuously runs in the background on all the machines on the network 12, gathering and disseminating information about the load on all the machines. The i-shell program consults with the loadmon program to select a set of machines to run the process. Both the rshell and the rmon programs communicate with the loadmon program that is running on all the machines to get the necessary information required to make a process migration decision.

The loadmon program may implemented as an extension of the above-noted distributed diagnosis algorithm described in S. Rangarajan an, A. T. Dahbura and E. Ziegler, "A distributed system-level diagnosis algorithm for arbitrary network topologies," IEEE Transactions on Computers, Special Issue on Fault-Tolerant Computing, Vol. 44, No. 2, pp. 312–334, February 1995, which is incorporated by reference herein. This distributed diagnosis algorithm enables the monitoring and dissemination of fault status information of nodes, e.g., workstations, on a network. In this algorithm, nodes monitor, i.e. "test," one another periodically such that each fault-free node is tested by exactly one other node. When a node detects that a fault-free node has become faulty or that a faulty neighbor has been repaired, it propagates this new information to its fault-free neighbors, which propagate the information to their neighbors, and so on. In this way, the system overhead due to monitoring is minimized during periods when the status of the nodes in the system does not change, and new information is disseminated as quickly as possible throughout the network.

When a faulty node is repaired, i.e., becomes fault-free, it sends a testme-join (tmj) message to one of its neighbors, informing that node that it is joining the system and asking that node to test it. If it times out on this request, it makes the request to another neighbor and so on until it finds a neighbor to test it. When a fault-free node gets information that its tester has failed, it realizes that it has become an "orphan." In this case, it sends a testme message to one of its neighbors asking that node to test it. This fault-diagnosis algorithm can be augmented to include load monitoring and implemented in the above-noted loadmon program. Similar to the dissemination of diagnosis information when there is a fault, a node also disseminates load information when there is a noticeable change in the load of the machine that it monitors. The change in load that triggers the dissemination of this information can be specified.

Referring again to the system 10 of FIG. 1, an application process P is first submitted to the program rshell 18-1 on primary host 14 which determines where the process P should be running. The program rshell 18-1 reads from a memory of primary host 14 the latest available load information about the other machines on the network 12. This memory may be shared with the loadmon program. Based on the load information, the rshell program determines a set of remote machines M1, M2, . . . Mk to which the process P should be migrated. Running on each selected remote machine, the migrated process could be successfully completed, or killed before completion as a result of the arrival of an interactive process or other failure. This status information is relayed back to the rshell program on the primary host 14. In this case, the rshell program selects another machine in system 10 and starts a copy of the process P on that machine.

The rmon program 17-i of a given remote machine Mi is invoked by the rshell program 18-1 that runs on the primary host 14. The migrated process name, the name of the host machine, and the port number on the host machine to which status information has to be sent back, are passed as arguments to the rmon program 17-i of the remote machine Mi. The rmon program then gathers information about the arrival of any interactive process at the remote machine. If the rmon program 17-i observes the arrival of an interactive process, it kills the migrated process P. Alternatively, in some circumstances it may allow the migrated process P to continue until it completes. The status of the migrated process P is passed to the rshell program 18-1 on the primary host 14. The machine name and the port number which had been passed as arguments are used for this purpose. The rmon program also periodically sends a "heart beat" message to the rshell program 18-1, such that a machine failure can be detected when a time out of a heart beat message occurs.

The above-noted libckp program may be used to checkpoint a process state. The libckp program acts as a checkpoint library, and saves and restores the data segments of a user program as well as dynamic shared libraries, stack segment and pointer, program counter, file descriptors, signal masks and handlers, etc. It also saves and restores files which are modified by the user program. A user program can be linked with the libckp program without any modification of the source code of the user program. A checkpoint is taken when the user program receives a specified signal. Therefore, the checkpoint interval of a given user program can be dynamically determined at run time by a checkpoint scheduler.

When a copy of the migrated process P finishes normally on a given remote machine Mi, the monitor program rmon 17-i of that machine sends an EXIT message to the shell program rshell 18-1 on primary host 14. Upon receiving the EXIT message, the rshell program terminates all other copies of the process P as well as all other rmon programs for the process P. To deal with a host machine failure, the above-noted watchd program 19-1 may be used to recover an rshell program failure due to, for example, a crash of the primary host 14. The watchd mechanism 19-1 thus provides a fail-over mechanism for processes. Every time a host rshell program 18-1 is invoked, it registers itself to the watchd program 19-1. If a failure of primary host 14 occurs, the rshell of a migrated process P can be restarted on a backup primary host 16 and all rmon programs for the process P reconnect themselves to the new rshell program 18-2 on backup primary host 16.

As mentioned previously, the invention utilizes the on-demand checkpointing described in conjunction with FIGS. 3 and 4 in combination with periodic checkpointing. The period for the periodic checkpointing may be set to a value which is larger than a typical period used in a conventional periodic checkpointing system. This will tend to further reduce the frequency and length of any roll-backs which may occur. This period may be fixed or variable. In one possible implementation, the period is fixed regardless of the status of the on-demand checkpointing, such that a periodic checkpoint is taken for a given execution of a process regardless of whether or not an on-demand checkpoint has already been taken for that execution of the process. Alternatively, a timer which measures the interval for the periodic checkpointing for a given execution of a process may be reset each time an on-demand checkpoint is taken for that execution of the process.

It should also be noted that the above-described illustrative embodiments of the invention can be implemented in a variety of distributed computing applications. For example, the invention can be implemented in a system which uses Common Object Request Broker Architecture (CORBA) middleware to provide reliability services for CORBA objects. The system can be included, for example, in a telecommunication platform as a basic component for building reliable distributed-object applications. It can maintain a constant degree of replication of an object by killing, checkpointing and migrating replicas of objects on demand as described above so that the expected execution time of an object can be minimized. These and numerous other alternative embodiments within the scope of the following claims will be readily apparent to those skilled in the art.

What is claimed is:

1. A method of executing a process submitted to a host machine in a distributed computing system, the method comprising the steps of:
    starting at least first and second executions of the process on respective first and second remote machines in the distributed computing system;
    utilizing one of the first and second executions of the process to provide an on-demand checkpoint for the other execution of the process in the event the other execution is terminated, such that an additional execution of the process is started from the on-demand checkpoint; and
    taking a periodic checkpoint of at least one of the first and second executions of the process, the process thereby being protected by a combination of on-demand checkpointing and periodic checkpointing.

2. The method of claim 1 wherein the step of taking a periodic checkpoint of at least one of the first and second executions of the process further includes taking the periodic checkpoint in accordance with a fixed period.

3. The method of claim 1 wherein the step of taking a periodic checkpoint of at least one of the first and second executions of the process further includes the step of resetting a timer used to establish a period for the periodic checkpoint of one of the first and second executions, when an on-demand checkpoint is taken for that execution.

4. The method of claim 1 wherein the other execution is terminated due to a process failure on the corresponding one of the remote machines, and the additional execution of the process is started on the same remote machine.

5. The method of claim 1 wherein the other execution is terminated due to (i) a failure of the corresponding one of the remote machines, or (ii) arrival of an interactive process at the corresponding one of the remote machines, and the additional execution of the process is restarted on a different machine.

6. The method of claim 1 wherein the host machine is informed of termination of one of the first and second executions of the process by a monitor program running on the corresponding one of the first and second machines.

7. The method of claim 1 wherein the host machine is informed of termination of one of the first and second executions of the process, resulting from a failure of the corresponding machine, by a distributed system level diagnosis algorithm running on the system.

8. The method of claim 1 further including the steps of:
    receiving in the host machine an indication that one of the executions of the process has been terminated;
    initiating the checkpoint by sending a checkpoint request message from the host machine to the remote machine at which the execution of the process is continuing;
    if a message indicating that the requested checkpoint has been taken is received by the host machine within a designated time out period, starting the additional execution of the process on one of: (i) the same remote machine, and (ii) another remote machine; and
    if the message indicating that the requested checkpoint has been taken is not received by the host machine within the designated time out period, restarting the first and second executions of the process on the first and second remote machines.

9. A distributed computing system comprising:
    a host machine; and
    at least first and second remote machines;
    wherein the host machine is operative to start at least first and second executions of a process on the respective first and second remote machines, and one of the first and second executions of the process are used to provide an on-demand checkpoint for the other execution of the process in the event the other execution is terminated, such that an additional execution of the process is started from the on-demand checkpoint, and wherein the host machine is further operative to take a periodic checkpoint of at least one of the first and second executions of the process, the process thereby being protected by a combination of on-demand checkpointing and periodic checkpointing.

10. The system of claim 9 wherein the periodic checkpoint is taken in accordance with a fixed period.

11. The system of claim 9 wherein the host machine is further operative to reset a timer used to establish a period for the periodic checkpoint of one of the first and second executions, when an on-demand checkpoint is taken for that execution.

12. The system of claim 9 wherein the other execution is terminated due to a process failure on the corresponding one of the remote machines, and the additional execution of the process is started on an additional remote machine.

13. The system of claim 9 wherein the other execution is terminated due to (i) a failure of the corresponding one of the machines, or (ii) arrival of an interactive process at the corresponding one of the machines, and the additional execution of the process is restarted on a different machine.

14. The system of claim 9 wherein the host machine is informed of a termination of one of the first and second executions of the process by a monitor program running on the corresponding one of the first and second machines.

15. The system of claim 9 wherein the host machine is informed of a termination of one of the first and second executions of the process, resulting from a failure of the corresponding machine, by a distributed system level diagnosis algorithm running on the system.

16. The system of claim 9 wherein the host machine is further operative: (i) to receive an indication that one of the executions of the process has been terminated; (ii) to initiate the checkpoint by sending a checkpoint request message to the remote machine at which the execution of the process is continuing; (iii) if a message indicating that the requested checkpoint has been taken is received within a designated time out period, to start the additional execution of the process on one of: (a) the same remote machine, and (b) another remote machine; and (iv) if the message indicating that the requested checkpoint has been taken is not received within the designated time out period, restarting the first and second executions of the process on the first and second remote machines.

17. An apparatus for use in executing a process submitted to a host machine in a distributed computing system, the apparatus comprising:

means for starting at least first and second executions of the process on respective first and second remote machines in the distributed computing system;

means for utilizing one of the first and second executions of the process to provide an on-demand checkpoint for the other execution of the process in the event the other execution is terminated, such that an additional execution of the process is started from the on-demand checkpoint; and means for taking a periodic checkpoint of at least one of the first and second executions of the process;

the process thereby being protected by a combination of on-demand checkpointing and periodic checkpointing.

18. An apparatus for use in executing a process submitted to a host machine in a distributed computing system, the apparatus comprising:

a memory in the host machine, the memory including a process queue for storing information related to the process; and a processor coupled to the memory, wherein the processor is operative to start at least first and second executions of the process on respective first and second remote machines of the system, wherein one of the first and second executions of the process are used to provide an on-demand checkpoint for the other execution of the process in the event the other execution is terminated, such that an additional execution of the process is started from the on-demand checkpoint, and wherein the processor is further operative to initiate a periodic checkpoint of at least one of the corresponding first and second executions of the process, the process thereby being protected by a combination of on-demand checkpointing and periodic checkpointing.

19. The apparatus of claim 18 wherein the periodic checkpoint is taken in accordance with a fixed period.

20. The apparatus of claim 18 wherein the processor is further operative to reset a timer used to establish a period for the periodic checkpoint of one of the first and second executions, when an on-demand checkpoint is taken for that execution.

21. A method of executing a process submitted to a host machine in a distributed computing system, the method comprising the steps of:

starting at least first and second executions of the process on respective first and second remote machines in the distributed computing system;

utilizing one of the first and second executions of the process to provide an on-demand checkpoint for the other execution of the process in the event the other execution is terminated, such that an additional execution of the process is started from the on-demand checkpoint; and taking a periodic checkpoint of at least one of the first and second executions of the process;

wherein the other execution is terminated due to (i) a failure of the corresponding one of the remote machines, or (ii) arrival of an interactive process at the corresponding one of the remote machines, and the additional execution of the process is restarted on a different machine.

22. A method of executing a process submitted to a host machine in a distributed computing system, the method comprising the steps of:

starting at least first and second executions of the process on respective first and second remote machines in the distributed computing system;

utilizing one of the first and second executions of the process to provide an on-demand checkpoint for the other execution of the process in the event the other execution is terminated, such that an additional execution of the process is started from the on-demand checkpoint;

taking a periodic checkpoint of at least one of the first and second executions of the process;

receiving in the host machine an indication that one of the executions of the process has been terminated;

initiating the checkpoint by sending a checkpoint request message from the host machine to the remote machine at which the execution of the process is continuing;

if a message indicating that the requested checkpoint has been taken is received by the host machine within a designated time out period, starting the additional execution of the process on one of: (i) the same remote machine, and (ii) another remote machine; and if the message indicating that the requested checkpoint has been taken is not received by the host machine within the designated time out period, restarting the first and second executions of the process on the first and second remote machines.

23. A distributed computing system comprising:

a host machine; and at least first and second remote machines;

wherein the host machine is operative to start at least first and second executions of a process on the respective first and second remote machines, and one of the first and second executions of the process are used to provide an on-demand checkpoint for the other execution of the process in the event the other execution is terminated, such that an additional execution of the process is started from the on-demand checkpoint, and wherein the host machine is further operative to take a periodic checkpoint of at least one of the first and second executions of the process, and further wherein the other execution is terminated due to (i) a failure of the corresponding one of the machines, or (ii) arrival of an interactive process at the corresponding one of the machines, and the additional execution of the process is restarted on a different machine.

24. A distributed computing system comprising:

a host machine; and at least first and second remote machines;

wherein the host machine is operative to start at least first and second executions of a process on the respective first and second remote machines, and one of the first and second executions of the process are used to provide an on-demand checkpoint for the other execution of the process in the event the other execution is terminated, such that an additional execution of the process is started from the on-demand checkpoint, and wherein the host machine is further operative to take a periodic checkpoint of at least one of the first and second executions of the process, and further wherein the host machine is further operative: (i) to receive an indication that one of the executions of the process has been terminated; (ii) to initiate the checkpoint by sending a checkpoint request message to the remote machine at which the execution of the process is continuing; (iii) if a message indicating that the requested checkpoint has been taken is received within a designated time out period, to start the additional execution of the process on one of: (a) the same remote machine, and (b) another remote machine; and (iv) if the message indicating that the requested checkpoint has been taken is not received within the designated time out period, restarting the first and second executions of the process on the first and second remote machines.

\* \* \* \* \*